April 21, 1925.
D. P. FURIATE
WINDOW GUARD
Filed April 10, 1924
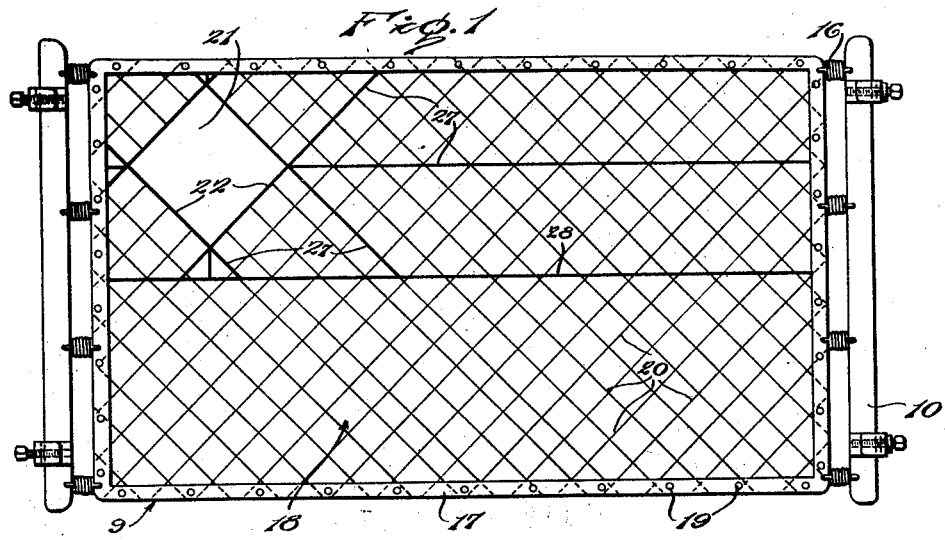
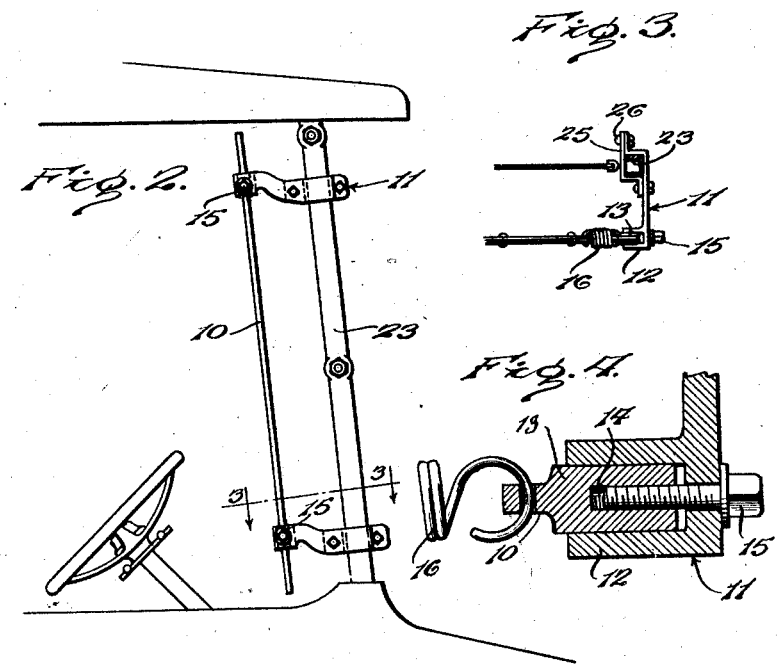
INVENTOR.
Daniel P. Furiate
BY Lacy & Lacy, ATTORNEYS.

Patented Apr. 21, 1925.

1,534,377

UNITED STATES PATENT OFFICE.

DANIEL P. FURIATE, OF TOLEDO, OHIO, ASSIGNOR OF ONE-HALF TO GEORGE W. ZAY, OF TIFFIN, OHIO.

WINDOW GUARD.

Application filed April 10, 1924. Serial No. 705,587.

*To all whom it may concern:*

Be it known that I, DANIEL P. FURIATE, a citizen of the United States, residing at Toledo, in the county of Lucas and State of Ohio, have invented certain new and useful Improvements in Window Guards, of which the following is a specification.

The present invention relates to a guard suitable for windows or windshields in all kinds of passenger carrying vehicles such as automobiles, railway coaches, trolley cars, omnibuses and the like.

The object of the invention is to furnish a guard of this character on the inside of the window or windshield so that in case a passenger is thrown violently in the direction of the window, he will be prevented by the guard from reaching the same and breaking the glass.

Another object of the invention is to prevent flying glass from an accidentally broken window from injuring the passengers.

In the accompanying drawing one embodiment of the invention is illustrated, and:

Figure 1 shows a front elevation of the guard;

Figure 2 is a fragmentary side elevation of an ordinary automobile with the guard in position thereon, Figure 3 is a fragmentary transverse sectional view on the line 3—3 of Figure 2, and Figure 4 is a similar sectional view on a larger scale.

In the drawings, the reference numeral 9 represents the guard as a whole. The guard consists of two bars or uprights 10 which are adapted to be carried approximately parallel to the glass or window against the breakage of which the guard is intended to provide protection. These uprights 10 are held in position by suitable brackets 11 which are secured in position to any suitable fixed part of the vehicle. In the drawing, the guard is represented as constructed for use upon an automobile and the brackets 11 are accordingly formed to embrace the side bars 23 of the windshield frame. The brackets are held in position by straps 25 and bolts 26, as clearly shown in Figures 2 and 3. It is evident that these parts of the brackets may be modified to suit conditions.

The free end of each bracket is provided with a jaw 12 into which an enlarged or reinforced portion 13 of the upright 10 is adapted to snugly fit. This enlarged portion 13 is provided with a threaded aperture 14 with which a screw 15 is engaged, this screw passing through a smooth opening in the outer side of the jaw 12 of the bracket 11, as best seen in Figure 4.

The guard frame 17 is preferably constructed of two pieces of flexible steel or other metal between which a wire mesh screen 18 is placed and the two opposite parts of the frame drawn tightly together by rivets 19 or secured in any other suitable manner as by welding. Along the two short sides of the frame 17 are furnished a number of perforations each adapted to receive one end of a tension spring 16, the other end of which is hooked into a corresponding opening provided in the adjacent upright 10. It will now be evident that by tightening the screws 15, the uprights 10 will be drawn apart in order to give the springs the desired tension and thus suspend the frame yieldingly between the uprights.

The wire screen 18 is preferably constructed of piano wire 20 or other wire of similar strength and fineness, the mesh being formed sufficiently close to prevent a large splinter of glass from passing therethrough but without interfering with the vision of passengers in the vehicle.

At 21 is shown an opening in the screen for operating the windshield cleaner of the automobile. If such an opening is desired, the wires 22 around the same are made from heavier material than that used for the screen proper so as to properly reinforce the opening and withstand the pull of the other wires. Similarly, longitudinally and diagonally extending reinforcing wires 27 are provided to which the wires 22 forming the opening may be attached. Ordinarily, however, this opening is omitted, in which case all the mesh wires are of uniform size with the exception of a central wire 28 which is provided in both cases and intended to stiffen the short sides and prevent their bending from the pull of the springs 16.

Referring particularly to Figure 2, in which the application of the invention to the windshield of an automobile is illustrated, the brackets 11 are shown of sufficient length to permit the proper spacing of the guard back of the windshield so that if a person is thrown against the guard the give of the springs 16 and the flexibility of the screen will cushion the contact of the person therewith and also prevent the person coming in contact with the glass of the windshield.

Having thus described the invention, what I claim is:

1. In a window guard, a frame, a screen stretched in said frame, means for yieldingly supporting the frame before a window; said means comprising brackets adapted to be secured around the window, said brackets having jaws, bars fitting snugly in said jaws, adjusting bolts for said bars in said jaws, and resilient elements connecting said bars with the frame.

2. In a window guard, a frame, a screen stretched in said frame, means for yieldingly supporting the frame before a window; said means comprising brackets adapted to be secured around the window, said brackets having jaws, bars fitting snugly in said jaws, adjusting bolts for said bars in said jaws, and springs connecting said bars with the adjacent ends of said frame.

3. In a window guard, a frame, a screen stretched in said frame, an opening being provided in said screen, means for yieldingly supporting the frame before a window; said means comprising brackets adapted to be secured around the window, bars adjustably mounted in said brackets, and resilient elements connecting said bars with said frame.

4. In a window guard, a frame, reinforcement for the ends of said frame, a screen including a mesh of metallic wire stretched in said frame, an enlarged opening being provided in said screen, reinforcing wires for said enlarged opening, means for yieldingly supporting the frame before a window; said means comprising brackets adapted to be secured around the window, said brackets having jaws, bars fitting snugly in said jaws, adjusting bolts for said bars in said jaws, and springs connecting said bars with the adjacent ends of said frame.

5. The combination with a vehicle windshield, of a frame supported in spaced relation thereto, a protecting screen stretched across said frame, means for yieldably supporting the frame before the windshield, said means comprising brackets adapted to be secured to the windshield frame, bars adjustably mounted in said brackets, springs connecting said bars with the screen frame, and means for adjusting the tension of the springs.

In testimony whereof I affix my signature.

DANIEL P. FURIATE. [L. S.]